United States Patent [19]
Archibald et al.

[11] 3,879,401
[45] Apr. 22, 1975

[54] PIPERIDINES

[75] Inventors: John Leheup Archibald, Windsor; John Lambert Jackson, Henley-on-Thames, both of England

[73] Assignee: John Wyeth & Brother Limited, Maidenhead, England

[22] Filed: Aug. 20, 1973

[21] Appl. No.: 390,150

[30]     Foreign Application Priority Data
    Sept. 1, 1972  United Kingdom............ 40617/72

[52] U.S. Cl..................... 260/293.64; 260/293.71; 260/293.76; 260/293.77; 424/267
[51] Int. Cl............................................ C07d 29/28
[58] Field of Search..... 260/293.64, 293.71, 293.77, 260/293.76

[56]         References Cited
         UNITED STATES PATENTS
2,792,399   5/1957   Ekenstam et al................. 260/294
3,038,835   6/1962   Endres et al......................... 167/52
         OTHER PUBLICATIONS
Harper et al., J. Med. Chem. 7(6), 729–732, (1964).

*Primary Examiner*—G. Thomas Todd

[57]            ABSTRACT

This invention relates to novel heterocyclic compounds having the formula:

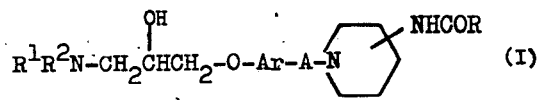

wherein Ar represents a phenylene radical; A is selected from the group consisting of lower alkylene, mono-keto lower alkylene and hydroxy lower alkylene radicals, in all of which the lower alkylene portion contains from 1 to 6 carbon atoms; R is selected from the group consisting of cyclohexyl and substituted or unsubstituted phenyl radicals; and $R^1$ and $R^2$ are the same, or different, and are selected from the group consisting of hydrogen and alkyl radicals of 1 to 6 carbon atoms which may be straight chain or branched; or $R^1$ and $R^2$ together with the nitrogen atom to which they are attached represent a heterocyclic ring of 4 to 6 carbon atoms; and the acid addition and quaternary ammonium salts thereof; which exhibit action on the cardiovascular system, in particular α-adrenoceptor antagonism. The invention also concerns pharmaceutical compositions containing the heterocyclic compounds of formula I.

11 Claims, No Drawings

PIPERIDINES

This invention relates to novel heterocyclic compounds, to processes for their preparation, and to pharmaceutical compositions containing the novel compounds.

According to the present invention there is provided a compound selected from the group consisting of compounds of formula:

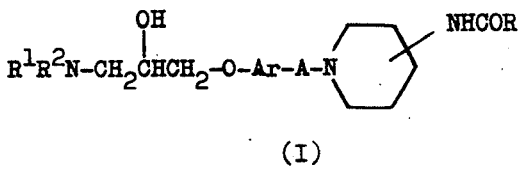

(I)

wherein Ar represents a phenylene radical; A is selected from the group consisting of lower alkylene, mono-keto lower alkylene and hydroxy lower alkylene radicals, in all of which the lower alkylene portion contains from 1 to 6 carbon atoms; R is selected from the group consisting of cyclohexyl and substituted or unsubstituted phenyl radicals; and $R^1$ and $R^2$ are the same, or different, and are selected from the group consisting of hyrogen and alkyl radicals of 1 to 6 carbon atoms which may be staight chain or branched; or $R^1$ and $R^2$ together with the nitrogen atom to which they are attached represent a heterocyclic ring of 4 to 6 carbon atoms; and the acid addition and quaternary ammonium salts thereof.

The compounds of formula (I) exhibit pharmacological activity, for example action on the cariovascular system (such as hypotensive and/or anti-hypertensive activity and $\alpha$-adrenoceptor antagonism) and may show anti-histamine activity and/or central nervous system activity (such as sedative or anti-convulsant activities) when tested on warm-blooded animals.

In addition to having useful pharmaceutical properties as mentioned above the novel compounds of the invention are intermediates for the preparation of other compounds of formula (I).

The group

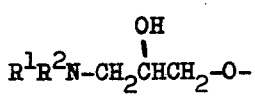

is preferably para to the link A but may for example be meta to this link.

Examples of R are unsubstituted phenyl or phenyl substituted by one or more groups, which may be the same or different selected from halogen (for example fluorine, chlorine or bromine), lower alkyl (for example methyl, ethyl, propyl, or butyl), lower alkoxy (for example methoxy, ethoxy, propoxy or butoxy), nitro, amino (including alkyl or dialkyl substituted amino groups) in particular dialkylamino (for example dimethylamino or diethylamino), acylamino in particular alkanoylamino [for example acetylamino (acetamido)], hydroxy, carboxyl, lower alkoxycarbonyl, alkylenedioxy (for example methylenedioxy), trihaloalkyl (for example trifluoromethyl), mercapto, methylthio, methylsulphonyl and phenyl.

The group A preferably contains from 1 to 4 carbon atoms. Examples of A are methylene, ethylene, propylene, butylene, oxoethylene, oxo-propylene, oxobutylene, hydroxyethylene, hydroxypropylene and hydroxybutylene.

Preferably $R^1$ represents a branched lower alkyl, e.g. isopropyl or s-or t-butyl. Preferably $R^2$ represents hydrogen.

Examples of acid addition salts are those formed from inorganic and organic acids in particular pharmaceutically acceptable acid addition salts such as the sulphate, hydrochloride, hydrobromide, hydro-iodide, nitrate, phosphate, sulphonate (such as the methanesulphonate and p-toluene-sulphonate), acetate, maleate, fumarate, tartrate and formate.

The compounds of general formula (I) can be prepared in a number of ways by building up the molecule from suitable starting materials in known manner.

A preferred method of preparing compounds of formula (I) comprises alkylating a corresponding hydroxy compound of formula (II)

(II)

wherein R, A and Ar as defined above with an alkylating agent of formula (III)

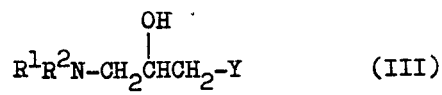

(III)

wherein $R^1$ and $R^2$ are as defined above and Y represents a halogen atom, e.g. chlorine or bromine, or an equivalent replaceable atom or radical such as for example an organic sulphonyl radical such as a tosyl radical.

The starting materials of formula (II) may be prepared by any of the methods described in Dutch application 71.12176.

Once a compound of general formula (I) has been prepared, then if necessary one or more substituents in the molecule may be converted to another substituent each within its own meanings specified in connection with formula (I). If a compound is produced in which the chain A contains a carbonyl function, then this chain may be selectively reduced. For example when A is the —CO—CH$_2$— residue this may be reduced with an alkali metal borohydride to give the

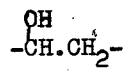

residue. Alternatively Wolff-Kishner reduction may be used when A is —COCH$_2$— to give the ethylene chain —CH$_2$CH$_2$—.

If a compound of formula (I) is produced having a particular —COR group, this may be hydrolysed to the compound of formula (I) in which the —COR radical is replaced by a hydrogen atom, which may then be reacted to give a compound of formula (I) having a different —COR group.

If necessary, in any of the reactions hereinbefore described, reactive substituent groups may be blocked during a reaction and released at a later stage. The compounds of the invention contain two basic nitrogen stoms. Thus the compounds can form acid addition salts with acids (particularly) pharmaceutically acceptable acids) or quaternary ammonium salts, for example with alkyl halides or aralkyl halides (particularly methyl iodide or benzyl chloride or bromide). The acid addition salts may either be formed in situ during the hereinbefore described processes and isolated therefrom or a free base may be treated with the appropriate acid in the presence of a suitable solvent and then the salt isolated. The quaternary salts may be prepared by treating the free base with the appropriate halide in the presence or absence of a solvent.

The invention includes a pharmaceutical composition containing as active ingredient a compound of formula (I) as hereinbefore defined, which may be micronised. In addition to the active ingredient, said compositions also contain a non-toxic carrier. Any suitable carrier known in the art can be used to prepare the pharmaceutical compositions. In such a composition, the carrier may be a solid, liquid or mixture of a solid and a liquid. Solid form compositions include powders, tablets and capsules. A solid carrier can be one or more substances which may also act as flavouring agents, lubricants, solubilisers, suspending agents, binders, or tabletdisintegrating agents; it can also be an encapsulating material. In powders the carrier is a finely divided solid which is in admixture with the finely divided active ingredient. In tablets the active ingredient is mixed with a carrier having the necessary binding properties in suitable proportions and compacted in the shape and size desired. The powders and tablets preferably contain from 5 to 99, preferably 10–80 percent of the active ingredient. Suitable solid carriers are magnesium carbonate, magnesium stearate, talc, sugar, lactose, pectin, dextrin, starch, gelatin, tragacanth, methyl cellulose, sodium carboxymethyl cellulose, a low melting wax, and cocoa butter. The term "composition" is intended to include the formulation of an active ingredient with encapsulating material as carrier to give a capsule in which the active ingredient (with or without other carriers) is surrounded by carrier, which is thus in association with it. Similarly cachets are included.

Sterile liquid form compositions include sterile solutions, suspensions, emulsions, syrups and elixirs. The active ingredient can be dissolved or suspended in a pharmaceutically acceptable sterile liquid carrier, such as sterile water, sterile organic solvent or a mixture of both. Preferably a liquid carrier is one suitable for parenteral injection. Where the active ingredient is sufficiently soluble it can be dissolved in normal saline as a carrier; if it is too insoluble for this it can often be dissolved in a suitable organic solvent, for instance aqueous propylene glycol or polyethylene glycol solutions. Aqueous propylene glycol containing from 10 to 75 percent of the glycol by weight is generally suitable. In other instances compositions can be made by dispersing the finely-divided active ingredient in aqueous starch or sodium carboxymethyl cellulose solution, or in a suitable oil, for instance arachis oil. Liquid pharmaceutical compositions which are sterile solutions or suspensions can be utilised by intramuscular, intraperitoneal or subcutaneous injection. In many instances a compound is orally active and can be administered orally either in liquid or solid composition form.

Preferably the pharmaceutical composition is in unit dosage form. In such form, the composition is subdivided in unit doses containing appropriate quantities of the active ingredient; the unit dosage form can be a packaged composition, the package containing specific quantities of compositions, for example packeted powders or vials or ampoules. The unit dosage form can be a capsule, cachet or table itself, or it can be the appropriate number of any of these in package form. The quantity of active ingredient in a unit dose of composition may be varied or adjusted from 5 mg. or less to 500 or more, according to the particular need and the activity of the active ingredient. The invention also includes the compounds in the absence of carrier where the compounds are in unit dosage form.

It has been found that certain compounds of the invention have particularly good α-blocking activity when measured by the method of Furchgott and Bhadrakom (J. Pharmac. exp. Ther., 108, 129-143 (1953)using Guinea-pig arterial strips. For instance 4-benzamido-1-{4-[4-(2-hydroxy3-(N-isopropylamino)propoxy)]phenyl-4-oxobutyl}piperidine gave a mean α-block $pA_2$ value of 8.1 in two experiments whereas the standard α-blocking agents thymoxamine and phentolamine in the same experiment had lower $pA_2$ values of 6.9 and 7.6 respectively.

EXAMPLE 1

4-Benzamido-1-{4-[4-(2-hydroxy-3-(N-isopropylamino)-propoxy)]phenyl-4-oxobutyl}piperidine.

p-(4-Chlorobutyryl)phenol (130 g. 0.655 mole), 4-benzamidopiperidine (134 g. 0.655 mole), triethylamine (70 g. 0.655 × 1.05 moles) and dimethylformamide were stirred at 60°C for 2 days, allowed to stand overnight, then filtered. The filtrate was diluted with a large volume of diethylether whereupon an oil precipitated which crystallised after being allowed to stand. This precipitate was filtered off, washed with diethylether (twice) then water (3times) dried and converted to the hydrochloride using hydrogen chloride gas dissolved in a mixture of isopropyl alcohol and ethanol to afford 4-benzamido-1-[4-(4-hydroxyphenyl)-4-oxobutyl]piperidine hydrochloride (43.5 g. 16%) m.p. 276°C.

Analysis: Found: C, 65.50; H, 6.73; N, 6.75%. $C_{22}H_{26}N_2O_3HCl$ requires C, 65.80; H, 6.78; N, 6.97%.

This phenol (12.06 g. 0.03 moles), 1-chloro-3-isopropylaminopropan-2-ol (4.55 g. 0.03 moles), ethanol (150 ml.) and 10M sodium hydroxide (9 ml.) were refluxed for 2 days. The mixture was filtered hot and the filtrate evaporated to dryness. The resulting foam was heated with 2M sodium hydroxide (150 ml.) on a steam bath for 10 minutes. The mixture was allowed to stand overnight and the resulting white solid was filtered off, washed with water (twice) and dried to afford the title compound (2.65 g. 18.2%) as the free base.

The free base was dissolved in a minimum volume of methanol and ethanolic HCl was added until the solution was just acidic. Ethyl acetate was added whereupon the title compound crystallised as the dihydrochloride, monohydrate (1.85 g. 10.8%)m.p. 207°c.

Analysis: Found: C, 58.85; H, 7.41; N, 7.18%. $C_{28}H_{39}N_3O_4.2HCl.H_2O$ requires, C,58.72; H,7.57; N,7.34%.

EXAMPLE 2

4-Benzamido-1-{4-[4-(2-hydroxy-3-(N-t-butylamino)-propoxy)]phenyl-4-oxobutyl}piperidine.

Following the procedure of Example 1 but replacing 1-chloro-3-isopropylaminopropan-2-ol with 1-chloro-3-t-butylaminopropan-2-ol the title compound is obtained as the free base which is then converted to the dihydrochloride.

EXAMPLE 3

4(p-Chlorobenzamido)-1-{4-[4-(2-hydroxy-3-(N-isopropylamino)-propoxy)]phenyl-4-oxobutyl}piperidine.

p-(4-Chlorobutyryl)phenol and 4-(p-chlorobenzamido)-piperidine are condensed in dimethylformamide/triethylamine in the manner of Example 1 to give 4-(p-chlorobenzamido)-1-[4-(4-hydroxyphenyl)-4-oxobutyl]piperidine. This is then refluxed for 2 days with 1-chloro-3-isopropylaminopropan-2-ol in ethanol containing 10M NaOH, also as described in Eaxmple 1. Work-up affords the title compound, as the dihydrochloride on crystallisation from ethanol/HCl.

EXAMPLE 4

4-(m-Methoxybenzamido)-1-{4-[4-(2-hydroxy-3-(N-isopropylamino)-propoxy)]phenyl-4-oxobutyl}piperidine.

p-(4-Chlorobutyryl)phenol and 4-(m-methoxybenzamido)-piperidine are condensed in dimethylformamide/triethylamine in the manner of Example 1 to give 4-(m-methoxybenzamido)-1-[4-(4-hydroxyphenyl)-4-oxobutyl]piperidine. This is then refluxed for 2 days with 1-chloro-3-isopropylaminopropan-2-ol in ethanol containing 10M NaOH, also using the method of Example 1. Work-up affords the title compound, as the dihydrochloride on crystallisation from ethanol/HCl.

EXAMPLE 5

4-Cyclohexanecarboxamido-1-{4-[4-(2-hydroxy-3-(N-isopropylamino)-propoxy)]phenyl-4-oxobutyl}piperidine.

p-(4-Chlorobutyryl)phenol and 4-cyclohexanecarboxamidopiperidine are condensed in dimethylformamide/triethylamine in the manner of Example 1 to give 4-cyclohexanecarboxamido-1-[4-(4-hydroxyphenyl)-4-oxobutyl]piperidine. This is then refluxed for 2 days with 1-chloro-3-isopropylaminopropan-2-ol in ethanol containing 10M NaOH, also following the method of Example 1. Work-up affords the title compound, as the dihydrochloride on crystallisation from ethanol/HCl.

EXAMPLE 6

4-Benzamido-1-{4-[2-hydroxy-3-(N-methyl-N-isopropylamino)-propoxy)]phenyl-4-oxobutyl}piperidine.

4-Benzamidopiperidine is alkylated with p-(4-chlorobutyryl)phenol in the manner of Example 1. The resulting phenol is condensed with 1-chloro-3-(N-methyl-N-isopropylamino)propan-2-ol, also using the method given in Example 1, to give the title compound. Conversion to the hydrochloride is effected by crystallisation from ethanol/HCl.

EXAMPLE 7

4-Benzamido-1-{4-[4-(2-hydroxy-3-piperidinopropoxy)]phenyl-4-oxobutyl}piperidine.

4-Benzamidopiperidine is alkylated with p-(4-chlorobutyryl)phenol in the manner of Example 1. The resulting phenol is condensed with 1-chloro-3-piperidinopropan-2-ol, also using the method of Example 1, to give the title compound. This is converted to the hydrochloride by crystallisation from ethanol/HCl.

EXAMPLE 8

4-Benzamido-1-{4-[4-(2-hydroxy-3-(pyrrolidin-1-yl)propoxy)]-phenyl-4-oxobutyl}piperidine.

4-Benzamidopiperidine is alkylated with p-(4-chlorobutyryl)phenol in the manner of Example 1. The resulting phenol is condensed with 1-chloro-3-(pyrrolidin-1-yl)-propan-2-ol, also using the method of Example 1, to give the title compound. This is obtained as the dihydrochloride on crystallisation from ethanol/HCl.

EXAMPLE 9

4-Benzamido-1-{4-[4-(2-hydroxy-3-(N-isopropylamino)propoxy)]-phenyl-4-hydroxybutyl}piperidine.

4-Benzamido-1-{4-[4-(2-hydroxy-3-(N-isopropylamino)-propoxy)]phenyl-4-oxobutyl}piperidine, prepared by the method of Example 1, is dissolved in methanol and excess solid sodium borohydride added with stirring. Work-up affords the title compound, as the dihydrochloride on crystallisation from ethanol/HCl.

EXAMPLE 10

4-Benzamido-1-{4-[4-(2-hydroxy-3-(N-isopropylamino)propoxy)]-phenylbutyl}piperidine.

4-Benzamido-1-[4-(4-hydroxyphenyl)-4-oxobutyl]-piperidine is prepared as described in Example 1 and then reduced using the standard Huang-Minlon modification of the Wolff-Kishner reduction. Work-up affords 4-benzamido-1-[4-(4-hydroxyphenyl)butyl]-piperidine, which is condensed with 1-chloro-3-isopropylaminopropan-2-ol in the manner of Example 1 to afford the title compound. Crystallisation from ethanol/HCl provides the dihydrochloride salt.

We claim:

1. A compound selected from the group consisting of bases of the formula:

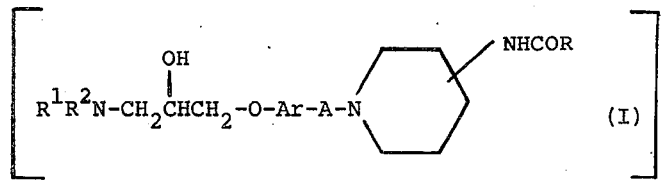

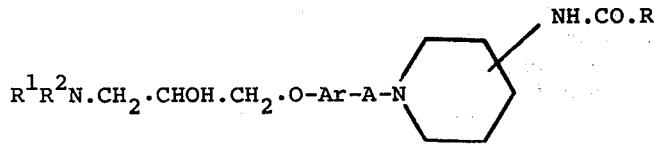

2. A compound as claimed in claim 1 which is 4-benzamido-1-{4-[4-(2-hydroxy-3-(N-isopropylamino)propoxy]phenyl-4-oxobutyl}piperidine.

3. A compound as claimed in claim 1 which is 4-benzamido-1-{4-[4-(2-hydroxy-3-(N-t-butylamino)propoxy)]phenyl-4-oxobutyl}piperidine.

4. A compound as claimed in claim 1 which is 4-(p-chlorobenzamido)-1-{4-[4-(2-hydroxy-3-(N-isopropylamino) propoxy)]phenyl-4-oxobutyl}piperidine.

5. A compound as claimed in claim 1 which is 4-(m-methoxybenzamido)-1-{4-[4-(2-hydroxy-3-(N-isopropylamino) propoxy)]-phenyl-4-oxobutyl}piperidine.

6. A compound as claimed in claim 1 which is 4-cyclohexanecarboxamido-1-{4-[4-(2-hydroxy-3-(N-isopropylamino) propoxy)]-phenyl-4-oxobutyl}piperidine.

7. A compound as claimed in claim 1 which is 4-benzamido-1-{4-[4-(2-hydroxy-3-(N-methyl-N-isopropylamino)propoxy)]phenyl-4-oxobutyl}piperidine.

8. A compound as claimed in claim 1 which is 4-benzamido-1-{4-[4-(2-hydroxy-3-piperidinopropoxy)]phenyl-4-oxobutyl}-piperidine.

9. A compound as claimed in claim 1 which is 4-benzamido-1-{4-[4-(2-hydroxy-3-(pyrrolidin-1-yl)propoxy)]phenyl-4-oxobutyl}piperidine.

10. A compound as claimed in claim 1 which is 4-benzamido-1-{4-[4-(2-hydroxy-3-(N-isopropylamino)propoxy)]phenyl-4-hydroxybutyl}piperidine.

11. A compound as claimed in claim 1 which is 4-benzamido-1-{4-[4-(2-hydroxy-3-(N-isopropylamino)propoxy)]phenylbutyl}-piperidine.

* * * * *

UNITED STATES PATENT AND TRADEMARK OFFICE
CERTIFICATE OF CORRECTION

PATENT NO. : 3,879,401
DATED : April 22, 1975
INVENTOR(S) : John Leheup Archibald and John Lambert Jackson It is certified that error appears in the above-identified patent and that said Letters Patent are hereby corrected as shown below:

Col. 6, Claim 1 should read, "A compound selected from the group consisting of bases of the formula:

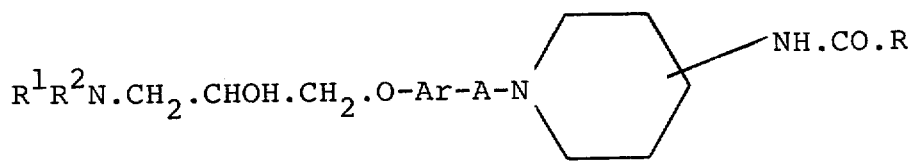

wherein Ar represents a phenylene radical; A is selected from the group consisting of lower alkylene, monoketo lower alkylene and hydroxy lower alkylene, in all of which the lower alkylene portion contains from 1 to 6 carbon atoms; R is selected from the group consisting of cyclohexyl, phenyl, halophenyl and lower alkoxyphenyl; $R^1$ and $R^2$ are each selected from the group consisting of hydrogen and alkyl radicals of from 1 to 6 carbon atoms or in combination with each other and the nitrogen atom to which they are attached constitute a pyrrolidino or piperidino ring; and the acid addition salts of said bases with pharmaceutically acceptable acids."

Column 1, line 34, "cardiovascular" is misspelled.

Column 5, line 22, "Example" is misspelled.

Signed and Sealed this

Fourteenth Day of September 1976

[SEAL]

Attest:

RUTH C. MASON
Attesting Officer

C. MARSHALL DANN
Commissioner of Patents and Trademarks